United States Patent [19]

Baer et al.

[11] Patent Number: 4,999,481

[45] Date of Patent: Mar. 12, 1991

[54] METHOD AND APPARATUS FOR SEQUENTIALLY NUMBERING MAIL PIECES

[75] Inventors: Patricia B. Baer, Pelham, N.Y.; Kevin D. Hunter, Stratford, Conn.; William G. Hart, Stamford, Conn.; Barry H. Axelrod, Newton, Conn.; Ronald P. Sansone, Weston, Conn.

[73] Assignee: Pitney Bowes Inc., Stamford, Conn.

[21] Appl. No.: 285,981

[22] Filed: Dec. 19, 1988

Related U.S. Application Data

[60] Continuation-in-part of Ser. No. 813,445, Dec. 26, 1985, Pat. No. 4,962,454, which is a division of Ser. No. 940,103, Dec. 10, 1986, Pat. No. 4,821,195.

[51] Int. Cl.[5] ........................ G06F 15/21; G06F 15/30

[52] U.S. Cl. .................................... 235/375; 235/494; 235/432; 364/464.02

[58] Field of Search ............... 235/375, 376, 432, 487, 235/494; 364/900, 406, 464.02, 464.03

[56] References Cited

U.S. PATENT DOCUMENTS

| | | | |
|---|---|---|---|
| 4,641,347 | 2/1987 | Clark et al. | 235/432 |
| 4,649,266 | 3/1987 | Eckert | 235/494 |
| 4,660,221 | 4/1987 | Dlugos | 235/432 |
| 4,713,761 | 12/1987 | Sharpe et al. | 364/406 |
| 4,725,718 | 2/1988 | Sansone et al. | 235/375 |
| 4,760,532 | 7/1988 | Sansone et al. | 235/375 |

FOREIGN PATENT DOCUMENTS

| | | | |
|---|---|---|---|
| 2193157 | 2/1988 | United Kingdom | 364/464.02 |

*Primary Examiner*—Stuart S. Levy
*Assistant Examiner*—Robert A. Weinhardt
*Attorney, Agent, or Firm*—Peter Vrahotes; Melvin J. Scolnick; David E. Pitchenik

[57] ABSTRACT

A mail sender processes batches of mail each of which is accompanied by a statement summarizing the type and number of mail pieces sent and amount of postage for each batch. During processing, each mail piece is identified by a unique number for security purposes.

19 Claims, 6 Drawing Sheets

METHOD AND APPARATUS FOR SEQUENTIALLY NUMBERING MAIL PIECES

CROSS REFERENCE TO RELATED APPLICATIONS

This application is a continuation-in-part of copending patent application Ser. No. 813,445 now U.S. Pat. No. 4,962,454, filed Dec. 26, 1985 and a division of co-pending patent application Ser. No. 940,103 filed Dec. 10, 1986 and issued as U.S. Pat. No. 4,821,195.

BACKGROUND OF THE INVENTION

Certain organizations dispatch large amounts of mail periodically. Examples of such organizations are: banking institutions, utility companies, insurance companies, credit companies, and the like. With such large quantities, these mailers normally pre-package and pre-sort their mail and are given a lower postage rate by the postal service because of the time saved by the postal service. There are generally two ways in which such mail senders apply postage to their mail. The most common way is by use of a postage meter which is leased by the mailer from a postage meter manufacturer with which the amount of postage required is applied to each mail piece. Inserter systems have been developed whereby inserts may be placed into an envelope and the envelope may be sealed, addressed and have a postage indicia applied thereto. The mail pieces may be weighed on the fly or individual weighing may not be required if all the mail pieces are of like kind, i.e., only a sample mail piece need be weighed. These acts of processing mail may be performed at a relatively high rate of speed.

A second method of mailing large quantities of mail pieces is the permit mail system. In such a system, the mailer places a permit number on the mail pieces and prepares a manifest listing that shows the type of number of mail pieces being mailed on each occasion and the postage required.

With both such systems, inspection at the site of the mail sender is frequently required. In the case of the postage meter, the lessor of the postage meter, i.e., the postage meter manufacturer, is required by law to inspect the postage meter at least twice a year to assure that there is no evidence of tampering with the postage meter that will indicate an attempt to obtain unauthorized postage. In the case of permit mail, large quantities of the same type of mail will be mailed at one time and the postal service will conduct an inspection to verify that the manifest listing accompanying the permit mail accurately accounts for the amount of postage due for the mail that has been processed by the postal service. This is accomplished through an inspection on the part the postal service by examining the records of the mail sender on every occasion.

Obviously, each of these two systems has certain drawbacks. In the case of on-site inspection of postage meters, with the large number of postage meters in use by large mail senders it is an expensive matter for the inspection thereof. Furthermore, postage meters that process large quantities of mail must be replaced relatively frequently because of wear. With regard to the permit mail system, the shortcoming lies in the need of the postal service to send a representative frequently to the various mail locations to assure that the mail sender is accurately accounting for the quantity of mail being sent. Such a scheme is not totally reliable as it relies largely upon on-site verification using the mailers records which are not secure.

SUMMARY AND OBJECTS OF THE INVENTION

A system has been conceived whereby a mailer is able to send large quantities or batches of mail without the need of on-site inspections. This is accomplished by the mailer having a secure accounting unit similar to a postage meter in which postage value is received from a dispensing or central station by charging a descending register in the accounting unit. A statement accompanies each batch of mail which statement contains information relative to the mail and the amount of postage required. Communication between the central station and the mail sender allows postage value to be transferred the to the user by the central station and mailing and verification data to be sent to the central station from the mailer. The mailing and verification data will be the same as that contained on the mailing statements that accompany the batches of mail. This system provides a central station for a large number of mail senders whereby the postal service is relieved of its obligation of having on-site inspections and the central station acts as a clearing house for the postal service through whom verification of postage can be conveniently and inexpensively achieved.

Another feature of the instant invention is that a unique serial number is provided to the user to be loaded into and stored in permanent memory to identify the user's accounting unit.

A further feature of this invention is that the security features of a postage meter are provided while allowing a high speed, relatively inexpensive printer to be used for printing the mail pieces.

A still further feature of this invention is that each mail piece is printed with a number that is unique to that mail piece. Preferably this unique mail piece number is a combination of the serial number of the user's accounting unit and the value of the ascending register of such accounting unit at the time mail is posted.

Still another feature of this invention is that postage information is printed on each mail piece at the same level as the postal bar code.

Yet another feature of this invention is the use of a unique number on each mail piece that uses a numbering system other than to the base 10.

Yet still another feature of the invention is that the statement sheet accompanying a posted batch of mail will have a unique number thereon.

DETAILED DESCRIPTION OF THE PREFERRED EMBODIMENT

Figure 1:
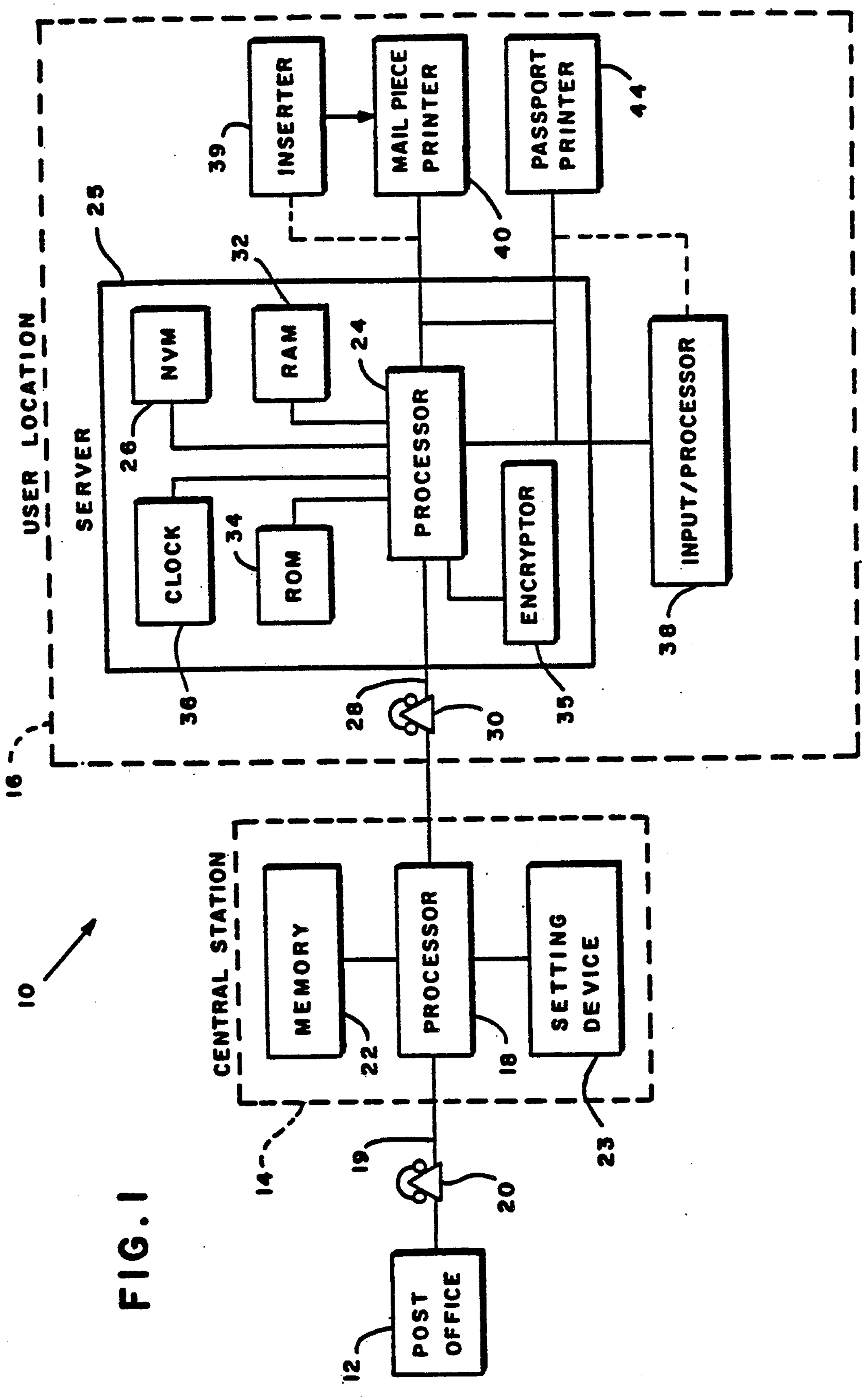
FIG. 1 is a block diagram of a batch mailing system.

Referring now to FIG. 1, a batch mailing system is shown generally at 10 and includes a post office 12, a central station 14 and a user location 16. The central station 14 has a processor 18. This processor 18 would be a main frame type of computer having substantial capacity. Communication is provided between the post office 12 and a plurality of central stations 14 (only one being shown) through a line or communication link 19 having a communication device such as a telephone 20 therein. Associated with the processor 18 and in connection therewith is a large storage memory unit 22 where large amounts of data can be stored and a register setting device 23 which includes meter setting software of the type required in the resetting of postage meters remotely. Systems for the resetting of meters remotely are well known, see for example U.S. Pat. Nos. 3,792,446, 4,097,923 and 4,447,890.

A remote user location 16 has a secure unit 25 which will be referred to as a "server". The server 25 is supplied by the central station 14 to the user and includes a user processor 24. Connected to the processor 24 is a first memory 26 and a second memory 35. Preferably the memories 26,35 will be non-volatile memories (NVM) that serve the function of a descending register (Desc Reg) and ascending register (Asc Reg), respectively. The user processor 24 is connected to the central station processor 18 through a communication link or line 28. A telephone 30 or other communication device may be disposed within the line 28 to thereby provide selective communication between the processors 18, 24. Also connected to the processor 24 are a RAM 32, a ROM 34, and a clock 36 whose respective functions will be described in detail hereinafter. An input/processor 38 is connected to the user processor 24 whereby data may be supplied, either manually or through, a medium such as a disc or tape, to the user processor 24 for the purpose of providing data required in the processing of mail pieces. The input/processor 38 may be any of a large number of personal computers having keyboard and display which are commercially available, such as an IBM XT personal computer.

A high speed inserter 39 is in electrical communication with the server 25 and performs the physical acts involved in processing the mail such as the inserting of inserts into envelopes, sealing the envelop flaps, orienting the mail pieces and conveying the mail pieces to a postage meter or printer. The term insert includes bills, advertising materials, notices, etc., which are of a size to be received within an envelope or the like. High speed inserters of this type are readily available commercially, as for example, Inserter Model No. 3100 series from Pitney Bowes Inc. Stamford, Conn.

A first printer 40 is in communication with the user processor 24 of the server 25 and with the input/processor 38 and is able to print upon mail pieces 42 such as envelopes containing inserts which it receives from the inserter 39. This printer 40 is a high speed printer which may be controlled either through the processor 24 or through the input/processor 38. A second printer 44 is provided to print upon a statement sheet 46 or other document. This second printer 44 may be a secure printer that is provided by the central station 14 or an unsecured printer provided by the user. By secure printer is meant a device constructed in the same manner as a postage meter without access to the interiors thereof except by authorized personnel. An example of such a postage meter is a Model 6500 postage meter available from Pitney Bowes Inc., supra. Throughout the balance of the specification and claims the statement sheet 46 printed by the printer 44 will be referred to as a "passport". Details of the passport 46 will be described hereinafter in conjunction with FIG. 2.

Although only one user location 16 is shown and described, it will be appreciated many user locations 16 will be serviced by the one central station 14. The central station 14 may be the location of a postage meter manufacturer or other accountable organization. Additionally, although only one mail piece printer 40 is shown and described it will be appreciated one server 25 may service a number of printers 40,44 and inserters 39.

In operation, the user at the user location 16 will be a sender of large quantities of mail who will be given a server 25 identification or serial number by the central station 14 that will be stored in the memory 26 that includes the descending register function. Obviously, this server 25 identification number may also be placed in the memory 35 that serves the ascending register function. This identification number will be permanent and unique for each server 25 and the user will have no access to that portion of the memory 26,35 that stores such identification number. It will be appreciated that this feature may be applied to postage meters as well. Having the identification number in memory 26,35 eliminates the need of having a plate applied to a postage meter or a server 25. It also will be appreciated that a server may have many characteristics of a postage meter, i.e., security, an ascending register, a descending register and the like, but certain elements are absent. The most evident absent element is a printer, the advantage of which is described hereinafter. Following loading of the identification number into the memory 26, the user will communicate with the central station 14 through the telephone 30 for the purpose of indicating to the central station 14 the amount of postage Value it wishes to have accredited to its memory 26. An access code will be given to the user that can be addressed to the setting device 23. Upon the receipt of the access code, the user will transmit to the central station 14 the access code and his identification number and the request for an amount of postage value. The setting device 23 will function to charge, or increase, the postage value into the memory 26. As stated previously, the memory 26 will include the descending register function. As the user location 16 processes mail, the postage value in the descending register will be decreased in accordance with the postage used or required to mail the mail pieces. As stated previously, devices for charging registers such as the descending registers are well known. In addition, as postage is applied to mail by the user, the amount of postage applied will be recorded in ascending register of the memory 35. Such recording of postage applied occurs with the processing of each mail piece. More specifically, after postage is applied to a mail piece, the amount of postage value used to mail those mail pieces will be added to the postage amount resident in the ascending register 35 from previous transactions. Thus, the ascending register will store the amount of all postage applied or debited throughout use of the particular server 25 in which it is housed. This postage amount is, therefore, ever increasing until such time as the server 25 is put out of service. In this way, the ascending register 35 always shows a different postage value after postage has been applied to a mail piece. For example, if the ascending register 35 had resident therein the number 1629457, this would indicate that the server 25 has applied $16,294.57 worth of postage throughout its use. If postage of $1,000.00 is applied to the next batch of mail pieces, the number in the ascending register would increase to 1729457 indicating $17294.57 worth of postage has been applied by the server 25 from its inception. Thus, the number resident in the ascending register 35 changes with every mailing transaction and is unique relative to that particular server 25. By printing the server 25 number and ascending register 35 value on each mail piece, a unique numbering system is obtained.

The balance of the server 25 includes the ROM 34 that 30 outputs address signals and stores a series of programs for controlling the functions of the server 25, a RAM 32 that will hold and supply real time data and a clock 36 that will provide the time and date.

It will be appreciated that the printer 40 is a high speed, inexpensive, unsecured printer such as a ink jet printer or laser printer or any type of dot matrix printer which will apply the addresses of the addressee and addressor to the face of the mail pieces as supplied by the input/processor 38. In addition to the value of the ascending register 35 and server number, other information can be printed optionally by the printer 40 upon each mail piece 42. This information could include a transaction number (T.A. No.), the run of the particular batch of mail, the date and time of mailing, the class of mail and a batch number. The transaction number is that number assigned to the user location 16 by the central station 14 every time postage value is added to the server 25 and will be stored in the NVM 26 This transaction number will be the same for one or more batches of mail that are sent and will remain the same until such time as the descending register of the NVM 26 is recharged with postage value, at which time a new transaction number will be assigned and stored in the memory 26 in place of the preceding transaction number. By changing the transaction number upon each recharge, an element is provided for verifying postage. The batch number is one assigned by the user through the input/-processor 38 whereby a given batch of mail, i.e., mail of a particular type or character, will be identified by a number assigned by the user. In addition, a run number, which is a subset of the batch, may be given to identified particular segments of the batch. Also, each mail piece may be numbered sequentially during each batch of mail processing.

When a batch of mail is to be sent, the user will supply mailing and verification information through the input/processor 38 into the user processor 24 which will transmit at least a portion of this information to the inserter 39. This information would include the number of mail pieces to be processed and number of inserts to be placed in each envelope. The time and date may be supplied to the printer 40 through the input/processor 38 by overriding the clock 36. This overriding is useful when future mail is being processed. The user processor 24 will then command the printer 40 to print on each mail piece the appropriate postage, time, date, transaction number and address. As the printer 40 prints the appropriate information upon each mail piece, the amount of postage required will be determined and the required postage and amount resident in the ascending register 35, after accounting for the amount for postage of that particular mail piece, may be printed upon the mail piece. At the end of the run or batch, the second printer 44 will print authorization information upon a passport 46. The postage required to post a batch of mail will be accounted for by the server 25 through the decrementing of the descending register 26 as each mail piece is processed.

Figure 2:
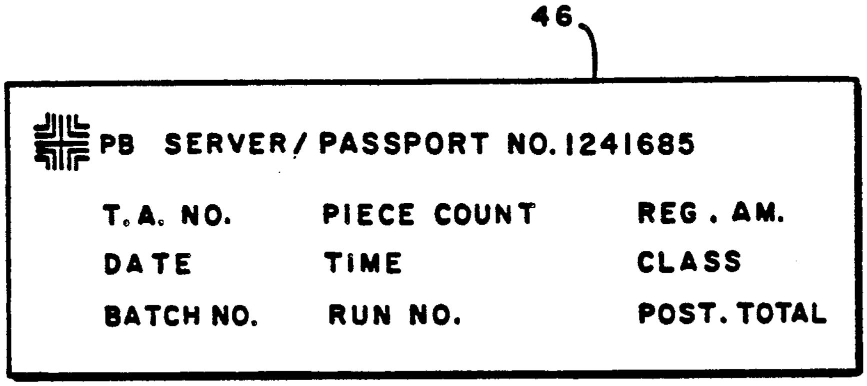
FIG. 2 is a plan view of an accounting statement sheet that would accompany batch mail processed by the system of FIG. 1.

Referring now to FIG. 2, the passport 46 is shown after having printed thereon the total postage (Post. Total) required to mail the batch of mail, the transaction number(T.A. No.), piece count for a batch, descending register amount (Reg. Am.) after the postage total required for the batch of mail has been accounted for, the date, the time, the class of mail, the batch number and the run number (optionally). Additionally, the server number, i.e., the identification number, by way of example the number 7124, stored in the memory 26, user name and passport number as well as any desired graphics may be printed on the passport 46. The server number and passport number may be combined into a single number identified as server/passport no. This information on the passport 46 serves many purposes. Firstly, the register amount acts as a physical record of the postage value stored in the descending register 26. This amount is printed on the passport 46 on the upper right hand. The register amount will be that amount in the descending register after all postal charges have been made for the batch of mail to be posted. By placing this register amount on the passport 46 after accounting for each batch of mail, an ongoing, permanent record is maintained of the amount of postage value contained within the descending register 26. In this way, if there is a disaster wherein the server 25 is destroyed or the memory 26 therein is erased inadvertently, the user will still have a means for verifying the amount of postage value remaining from that amount of postage value purchased and stored. The transaction number provides an authorization check as does the identification or server number. By changing the transaction number with each recharge of the server 25, one is aided in determinations of validity of batches of mail. Also printed on the passport 46 will be the passport number, the date and time the passport 46 is printed, the piece count, i.e., the number of mail pieces mailed in the particular batch, and the class of mail. At the time of the printing of the information on the passport 46, the postage amount for the batch will be subtracted from postage value stored in the descending register of the 26, i.e., the debiting of the descending register 26 and printing of the passport 46 will be simultaneous. At the same time, the postage value stored in the ascending register 35 will be increased in an amount equal to the postage amount required to mail the batch of mail. Obviously, the ascending register 35 will incremented the same postage value amount the descending register 26 is decremented.

The information printed upon the passport 46 is transmitted to the central station 14 through the communication line 28 after each batch or periodically and is processed so that a record is maintained through the processor 18 that communicates with memory 22. The memory 22 has an ascending register therein that corresponds to the ascending register 35 in the server 25. As stated previously, an ascending register is one that accumulates charges over a long term. Optionally, the memory 22 may have a descending register that duplicates the amounts in the descending register 26 on an ongoing basis. By having the postage value contained within the memory 22 that corresponds to the value of the server 25, a check may be made to assure there is a correspondence between the passport 46 information and the amount of postage paid by the user. More specifically, the total postage value credited to the user location 16 will be stored in memory 22 and if the amount required to mail a particular batch of mail exceeds the amount of postage value available to the user, the user location 16 will be notified that there are insufficient funds.

When a batch of mail is sent to a post office for mailing, the passport 46 for that particular batch will accompany the mail. The postal employee can determine whether it is an authorized batch of mail from the information contained upon the accompanying passport 46. If there is any question on the part of the postal service as to whether the information is authentic, it will contact the central station 14 and through the line 19 obtain the information from the central station 14 to verify the information contained on the passport 46. If this information is accurate, then the postal service will know that the mail is authorized, i.e., the postage for the mail has been paid. On the other hand, if there is any discrepancy, the postal service is able to act to ferret any fraud or correct any discrepancy. As is the usual practice in the user of postage meters, a user location 16 will send all its mail to an assigned post office which is referred to as the entry point.

Figure 3:
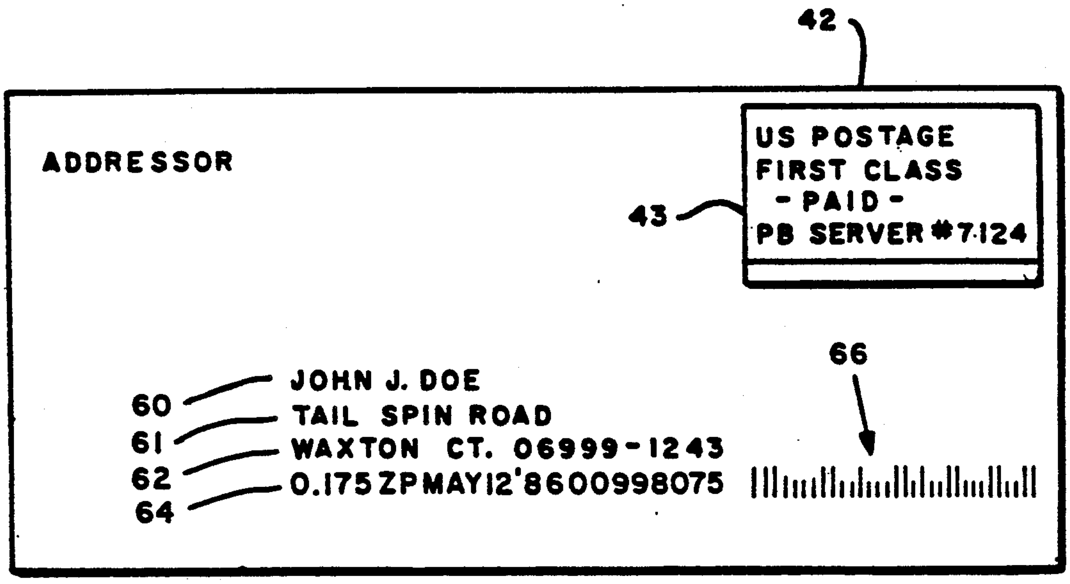
FIG. 3 is a plan view of an envelope containing data in accordance with the instant invention.
Figure 4:
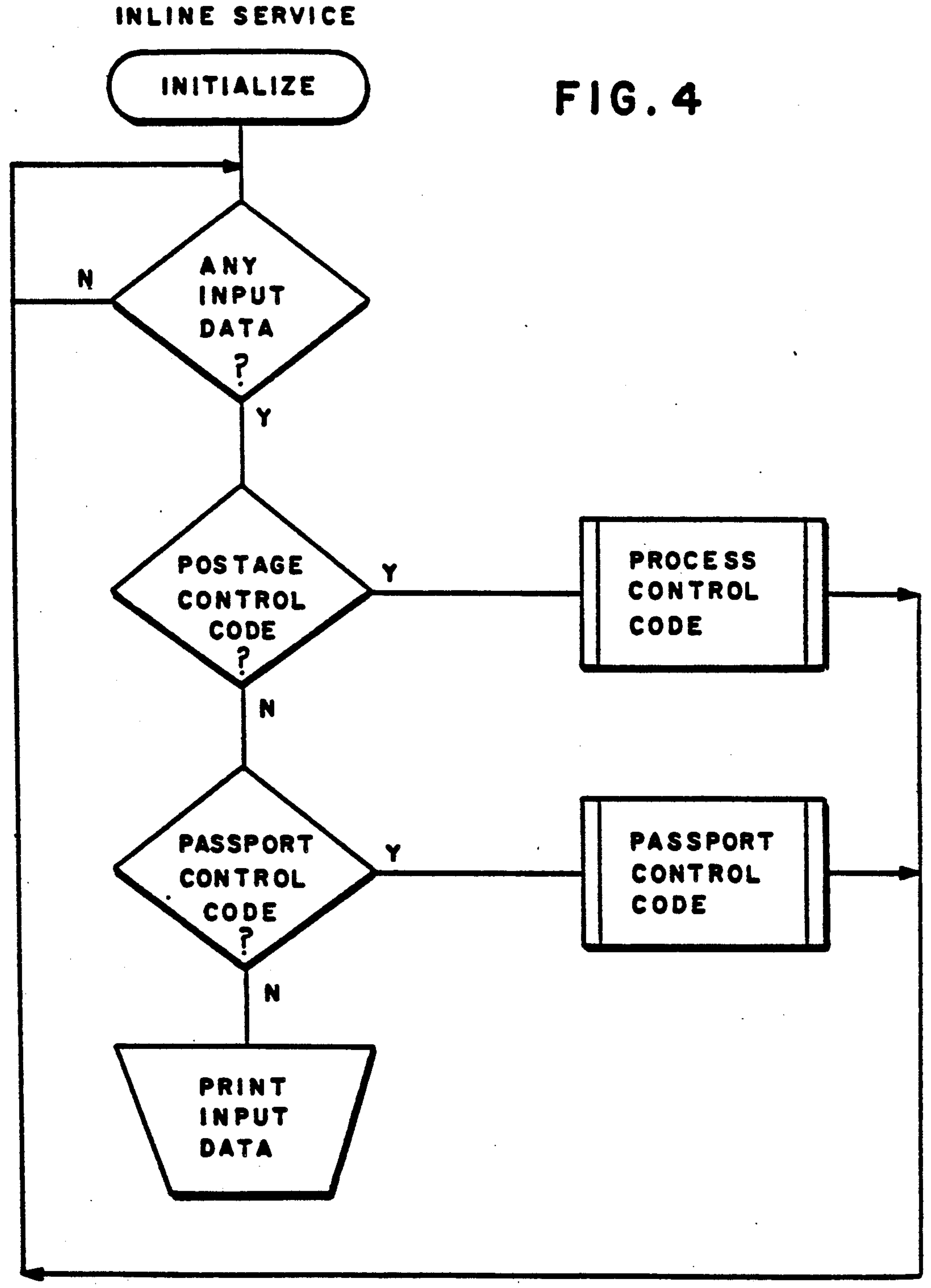
FIG. 4 contain flow chart that describe the functions of the system shown in FIG. 1.
Figure 5:
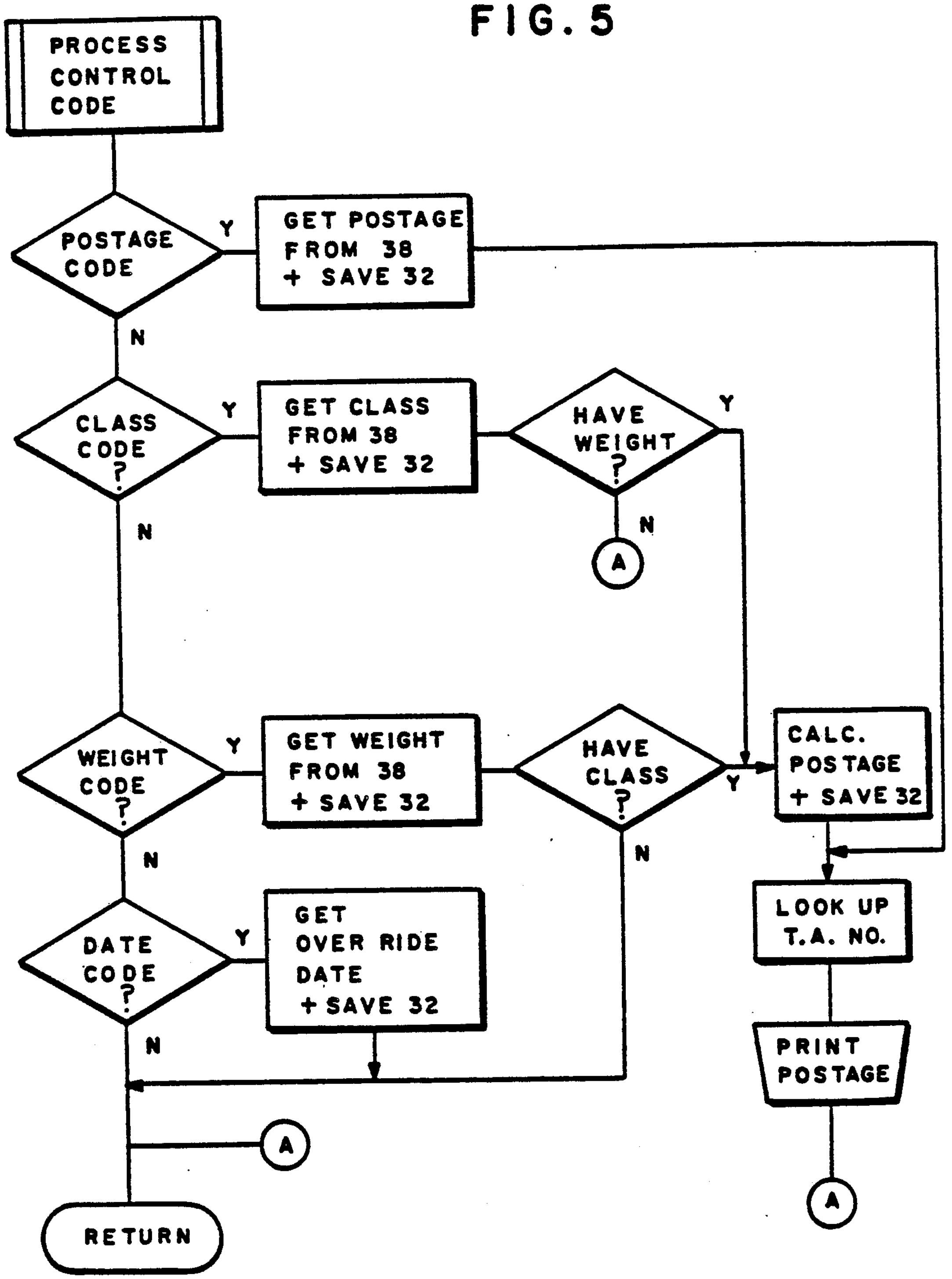
FIG. 5 is a flow chart describing the process control code shown in FIG. 4.
Figure 6:
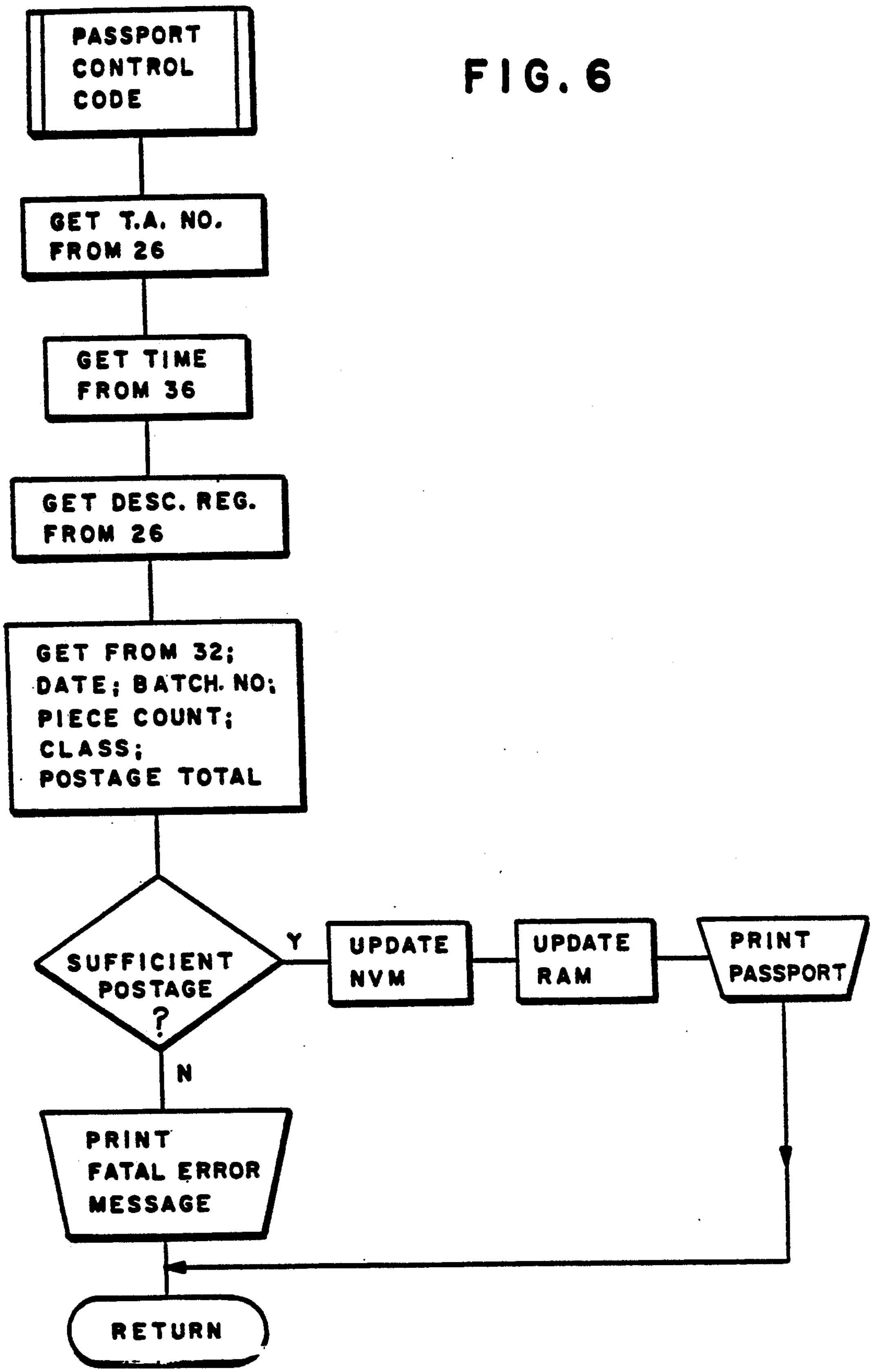
FIG. 6 is a flow chart describing the passport control code shown in FIG. 4.

Referring now to FIG. 3, an envelope 42 is shown as it would be prepared by the present system 10. The upper left hand corner contains the address of the mail sender and the upper right hand corner contains a pre-print block 43 containing the class of mail and gives the identification number or server number of the mail sender, in this example #7124. This information may be preprinted on the envelopes 42 prior to processing of a batch of mail. Such preprinting may accomplished through direct communication of the input/processor 38 with the printer 44 without any participation of the other components of the user location 16 or by another printer that is independent of the system shown in FIG. 1.

In the processing of batch mail, the three address lines 60,61 and 62 will first be printed in the address field with the name of the recipient, the street address and the city, state, zip code, respectively. The first line 64, or postage line, is then printed using information supplied by the processor 24. This postage line, includes the postage amount 17½ cents, the type of pre-sort discount (ZP) the date, May 12, 1986 and the postage value stored in the ascending register 27 after postage has been applied to the mail piece 42, which in this example is the value 0009998075. It will be noted that the postage line is horizontally aligned with the bar-half bar posted zip code 66. The bar-half bar code 66 is frequently printed by the post office to facilitate the processing of mail. In particular, post offices equipped with optical character reading/channel sorting (OCR/CS) equipment will read the zip code printed on the face of a mail piece. Subsequent to reading the zip code, the OCR/CS will print the bar-half bar zip code on that mail piece. By having the postage line 64 at the same level as the bar-half bar, the opportunity is afforded the user to print both the postage line 64 and postal zip code 66 in one pass. Printing of the postal zip code 66 by the user could result in a lower postal rate. Other information may be given on the postage line 64 as desired including the time the mail is processed. Although the postage line is shown in alpha numerics it will be appreciated that the same may be printed in bar code and, optionally, bar code address information may be printed on the envelope as desired. Additionally, the information in the pre-print block 43 may be printed in the address field with the other information therein and the preprint block may be eliminated as will be described with reference to FIG. 7.

The advantage of having the ascending number printed on the envelope 42 is that a unique number or combination of numbers is obtained on each mail piece. Because the ascending register number continually increases as long as a particular server 25 is in use, a different number appears in the postage line 64 of the envelope 42. This is not true of the descending register value where numbers repeat upon the descending register 26 being recharged. The ascending register 35 value printed upon an envelope 42 in combination with the server 25 number, or other identification number, will provide a unique number on envelopes. Of course, other servers 25 will produce duplicate ascending register numbers on mail pieces they process; however, because the server serial number is different, every mail piece 42 processed by all servers will have a unique number thereon which is a combination of the server serial number and the ascending register postage value at the time of processing. Although this unique envelope number concept has been described as it relates to a server 25, it will be appreciated that the concept applies equally as well to postage meters since each postage meter is assigned a unique meter number and has an ascending register that increases in value as long as the postage meter is in service.

The advantage of printing a unique number on an envelope is security. Upon inspection of mail pieces by postal authorities, if mail pieces with identical server serial numbers and ascending register value numbers are found, it will be known that the mail pieces are unauthorized, i.e., postage has not been paid. As stated previously, each server 25 is assigned to a given post office, i.e., all the mail from a particular user location 16 must be sent to an assigned post office. This affords the post office the opportunity of monitoring mail with given server serial numbers and reduces the ability of a fraudulent mailer to send unauthorized mail. With OCR/CS equipment, in particularly, it becomes relatively easy to read the unique numbers on envelopes and make a determination that one number duplicates another.

Although an envelope 42 shown has the postage and address information printed on the face thereof the same scheme will apply to a windowed envelope. A windowed envelope 100 may be preprinted as previously described but instead of the printer 40 printing on the face of the envelope 42, an insert would be printed with the same address lines 60,61,62 shown on the face of the envelope 42 and inserted so as to be viewed from the window. Alternatively, the postage and address information may be printed upon a label and the label may be attached to the envelope 42.

Figure 7:
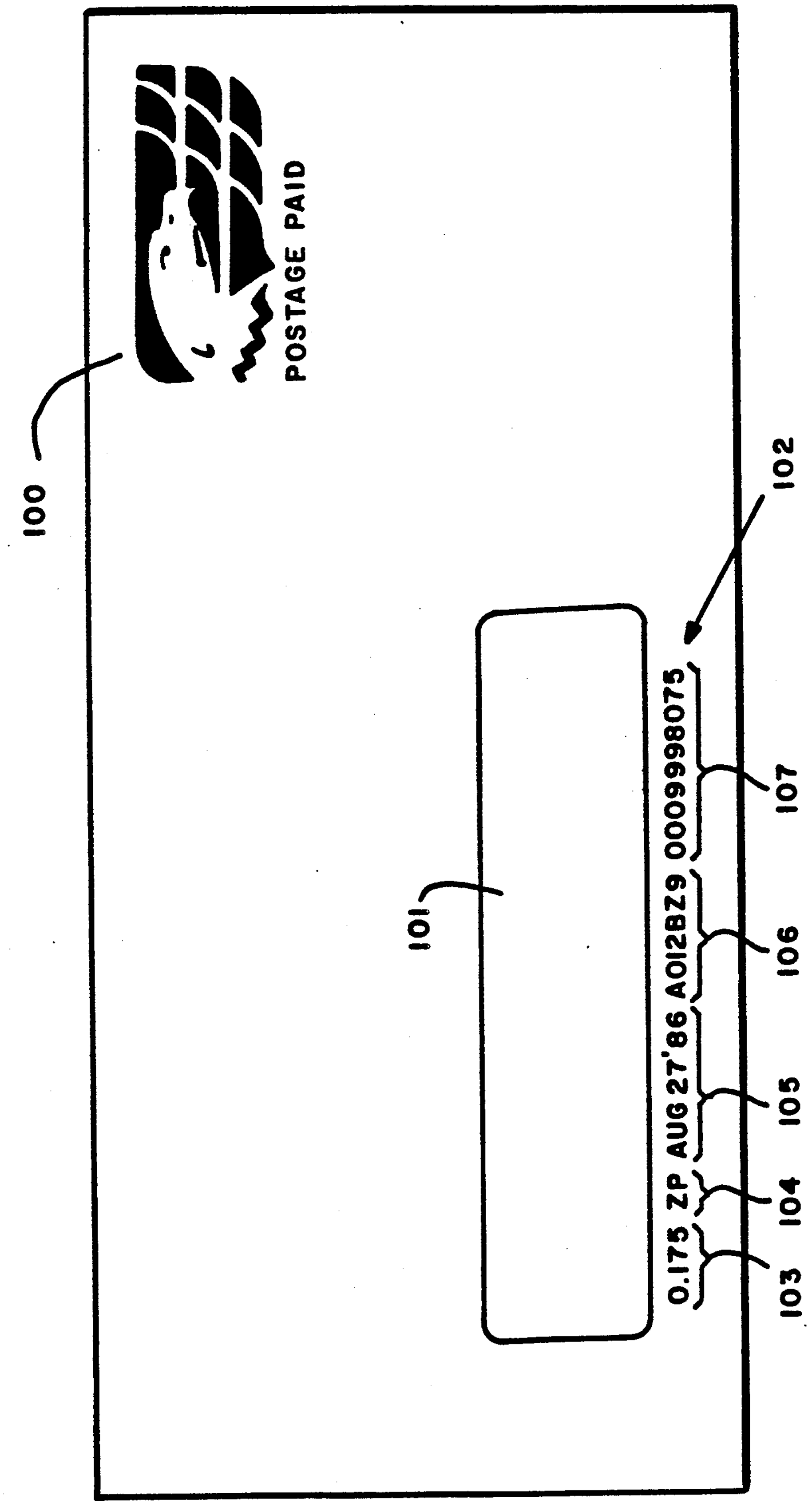
FIG. 7 is a plan view on a windowed envelope containing data in accordance with the instant invention.

FIG. 7 is an illustration of a windowed envelope 100 printed with data thereon in accordance with the instant invention. The mailing or destination address may be printed on a facing insert for the envelope, to be visible in the window 101. The printer 40 also prints the postage line 102 which includes the postal rate 103, the class of mail 104, the date of mailing 105, the serial number 106 of the server 25 and the ascending register postage value 107. It is to be especially noted that the ascending register postage value 107, as well as some or all of the remainder of the postage line, may be presented in bar code format.

The server number in this particular embodiment is A012B79. This number is from a numerical system premised on the base 32 rather than the base 10. Such a numerical system that is premised on the base 32 is well known, for example automobile license plates. In a base 32 numerical sequence both numbers and letters must be used in formulating the numerical sequence. For example, the letters of this alphabet would correspond to the first 26 digit in a number system to the base 10 then the next six digits would be 1,2,3,4,5,0. By way of example, the number 51 to the base 10 would be the same as the number AS to the base 32 and the number 64 to the base 10 would be the same as B0 to the base 32. Such an expanded numerical system is required because large sums are passed through a postage meter or server in its lifetime and in order to keep the number of digits low numerical system to the base 10 would be inconvenient.

Still another scheme for processing mail batches is to use truncated numbers on the passport 46 or mail piece 42,100 that represent a combination of at least a portion of two independent numbers. These independent numbers could be the passport number, server number, postage value of the ascending register, postage value of the descending register, mail piece number and the like. Such a truncated number may be applied to the passport 46 that accompanies the batch of to the post office. Referring once more to FIG. 7, a truncated server/ascending register number 106 is provided in which the first three digits A01 may represent the server 25 identification number and the last four digits 2B29 may represent the ascending register value number. Although the server identification number may have more than three digits, only the last three digits of that number would be used for the server/passport truncated number. The same is true with regard to the ascending register number where the last four digits would be used for the last four digits of the server/passporrt number. Obviously, a degree of security would be sacrificed since each mail piece would not have an absolute unique number., but space would be saved. Where unique numbering is not required these truncated numbers would be most beneficial. Another example is a combination of a portion of the server number combined with a portion of the passport number. Referring to FIG. 2 once more, the passport/server number 1241685 could be the last three digits of the server 25 serial number (7124) and the last four digits of the passport number that would normally be assigned. Other combinations using the postage value of the descending register, the mail piece number and the like, could also be used.

In this way what is provided is a method of allowing a organization to send large amounts of mail with self authenticating information. By having combinations of identification numbers a visual examination would give a degree of assurance that the mail being received by a post office is authorized. Thus, the postal service is saved the problem of requiring on-site inspections at the user location 16 in order to verify that no unauthorized mail is being sent. By correlating the amount of postage, the transaction number, piece count, server number, passport number and the like, verification can be made. Additionally, a further check is provided by printing upon each envelope 42 the combination of an indication of the postage value in the ascending register and the server 25 identification number. This provides a relatively simple method to assure additional mail pieces for which postage has not been paid have not been added to a batch of mail.

What is claimed is:

1. An apparatus for processing and providing authentication information relative to the payment of postage for a batch of mail, said apparatus comprising:

means for processing a plurality of mail pieces for mailing including a register having postage value store therein;

means for reducing the postage value in said register for the postage required to mail said plurality of mail pieces and means for determining the amount of postage required to mail said plurality of mail;

means for printing a truncated number on each of said mail pieces that is a combination of portions of at least two numbers associated with the processing of said mail pieces whereby payment of postage can be determined by verifying the distinctness of each of said truncated numbers.

2. The apparatus of claim 1 further comprising means for encrypting said numbers associated with the processing of said mail pieces and wherein said truncated number is a truncated portion of an encrypted number.

3. The apparatus of claim 1 wherein said apparatus has a serial number and each said truncated number is a combination of portions of a mail piece number and said serial number.

4. The apparatus of claim 3 wherein said numbers are derived from a base 32 numerical system.

5. The apparatus of claim 3 wherein said numbers are derived from a numerical system other than the numerical system to base ten.

6. The apparatus of claim 3 wherein said truncated number includes said postal value stored in said register.

7. The apparatus of claim 6 wherein said register is an ascending register.

8. The apparatus of claim 6 wherein said register is a descending register.

9. The apparatus of claim 1 wherein said apparatus has a serial number and said truncated number is printed as a combination of portions at least one of said serial number and said register postage value number.

10. The apparatus for processing and providing information relative to authenticating the payment of postage for a batch of mail, comprising:

a register with a value stored therein;

means for preparing a plurality of mail pieces for mailing and determining the amount of postage required to mail said plurality of mail pieces;

means for reducing the amount of postage value in said register an amount equal to the amount of postage required to mail said plurality of mail pieces;

means for preparing a statement sheet containing the number of mail pieces prepared and the postage required to mail said plurality of mail pieces; and means for placing a distinct number derived from said number of mail pieces prepared and said required postage on said statement sheet, whereby the payment of postage can be determined by verifying said unique number.

11. The apparatus of claim 10 wherein said statement sheet has an identification number and said distinct number is a combination of portions of the statement sheet identification number and said required postage.

12. The apparatus of claim 11 wherein said identification and associated numbers are derived from a base 32 numerical system.

13. The apparatus of claim 11 wherein said identification and associated numbers are derived from a numerical system other than a base 10 numerical system.

14. The apparatus of claim 10 wherein said distinct number is a truncated number.

15. The apparatus of claim 11 wherein said unique number is a truncated portion of an encrypted number.

16. In a method of authenticating the payment of postage for a batch of mail, the steps comprising:

placing postage value in a register, processing a plurality of mail pieces for mailing including determining an amount of postage required to mail said batch of mail, placing a distinct number derived from portions of at least two numbers associated with said batch of mail and based on a numerical system other than the base ten numerical system on each individual mail piece, and determining the authenticity of said payment of postage by inspection of said distinct number.

17. The method of claim 16 further comprising the step of:

selecting said distinct number from a combination of a mail piece number and the serial number of a device used in processing the mail.

18. The method of claim 17 further comprising the step of:

representing said numbers in a base 32 numerical system.

19. The method of claim 16 further comprising the step of:

deriving said distinct number as a combination of at least a portion of two numbers associated with the batch of mail.

* * * * *